United States Patent
Murray et al.

(10) Patent No.: US 6,802,411 B2
(45) Date of Patent: Oct. 12, 2004

(54) DAMPENING DATUM PLATE FOR DISC DRIVE COMPONENT ASSEMBLY

(75) Inventors: Michael T. Murray, Yukon, OK (US); Sabrina L. Murray, Yukon, OK (US); Roger A. Jessen, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 65 days.

(21) Appl. No.: 10/379,280

(22) Filed: Mar. 4, 2003

(65) Prior Publication Data

US 2004/0064933 A1 Apr. 8, 2004

Related U.S. Application Data

(60) Provisional application No. 60/415,816, filed on Oct. 3, 2002.

(51) Int. Cl.[7] .................. B65G 15/64; B65G 21/22; B65G 47/22; B65G 47/24; B65G 37/00
(52) U.S. Cl. ................... 198/345.3; 198/346.2
(58) Field of Search ............ 198/345.1, 345.3, 198/346.1, 346.2

(56) References Cited

U.S. PATENT DOCUMENTS

| | | |
|---|---|---|
| 4,777,550 A | 10/1988 | Taguchi et al. |
| 4,947,093 A | 8/1990 | Dunstan et al. |
| 5,366,200 A | 11/1994 | Scura |
| 5,400,196 A | 3/1995 | Moser et al. |
| 5,469,311 A | 11/1995 | Nishida et al. |
| 5,600,059 A * | 2/1997 | Sondey ............ 198/346.1 |
| 5,708,633 A | 1/1998 | Hollen et al. |
| 5,761,031 A | 6/1998 | Ajmani |
| 5,777,821 A | 7/1998 | Pottebaum |
| 6,009,990 A * | 1/2000 | Davis ............ 198/346.3 |
| 6,049,969 A | 4/2000 | Jenkins et al. |
| 6,233,143 B1 | 5/2001 | Gamble et al. |
| 6,275,352 B1 | 8/2001 | Tadepalli et al. |
| 6,300,774 B1 * | 10/2001 | Lim ............ 198/345.3 |
| 6,411,470 B1 | 6/2002 | Hamilton et al. |
| 6,418,807 B2 * | 7/2002 | Gladen ............ 74/89.33 |
| 6,456,453 B1 | 9/2002 | Wauke et al. |
| 6,466,398 B1 | 10/2002 | Butler et al. |
| 6,477,042 B1 | 11/2002 | Allgeyer et al. |

* cited by examiner

*Primary Examiner*—Gene O. Crawford
(74) *Attorney, Agent, or Firm*—Jennifer M. Buenzow

(57) ABSTRACT

A dampening datum plate assembly for an assembly line for components, the dampening datum plate assembly having a member for moving a component from a conveyor to a datum position at an assembly station, a dampening pin assembly supported at the datum position for absorbing vibrational shock from the component moved by the moving member. The moving member has a plate on which is supported a second dampening pin assembly for absorbing vibrational shock from contact of the plate with the component. Each dampening pin assembly has a replaceable compressible pellet member that absorbs vibrational shock.

27 Claims, 6 Drawing Sheets

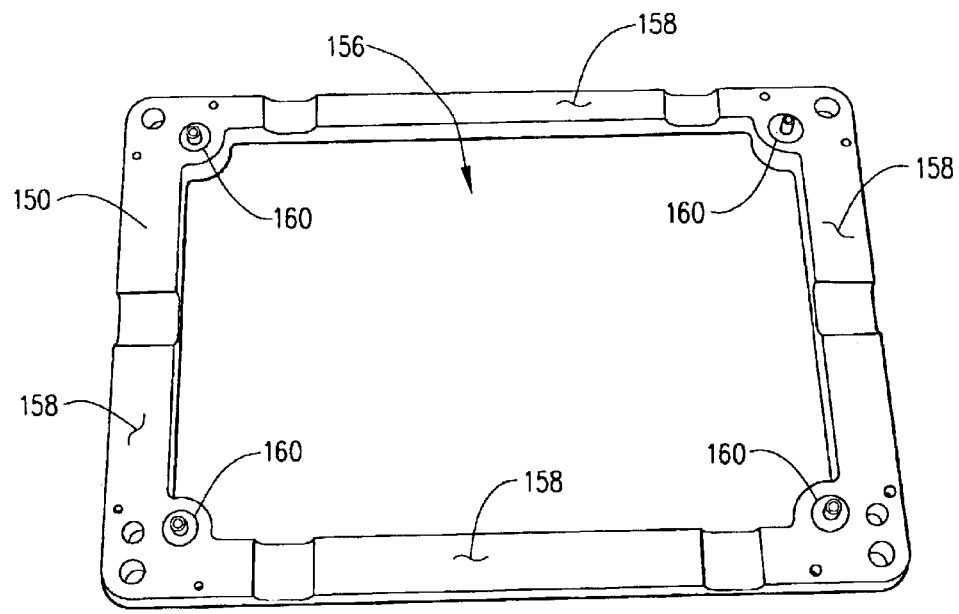
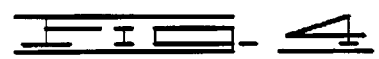
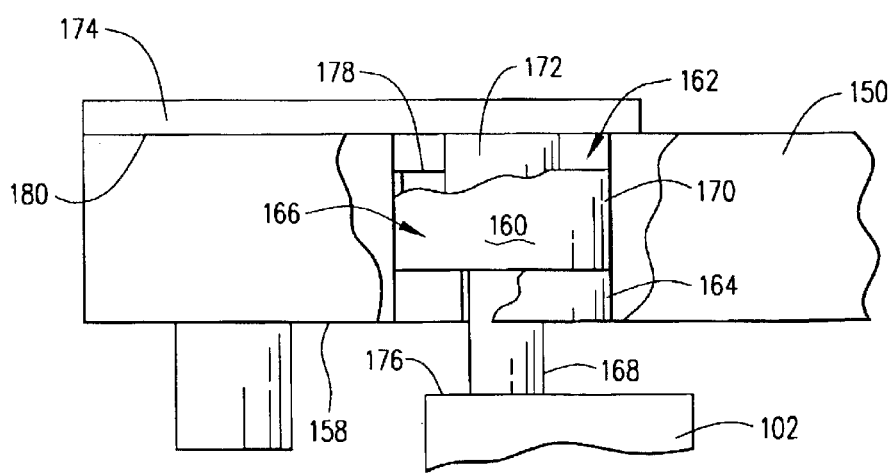

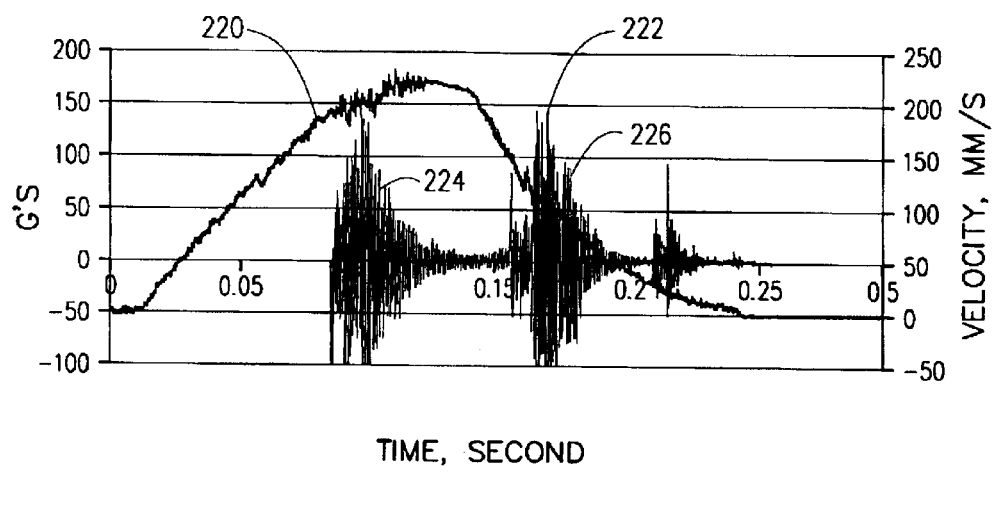
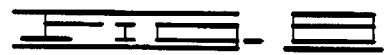
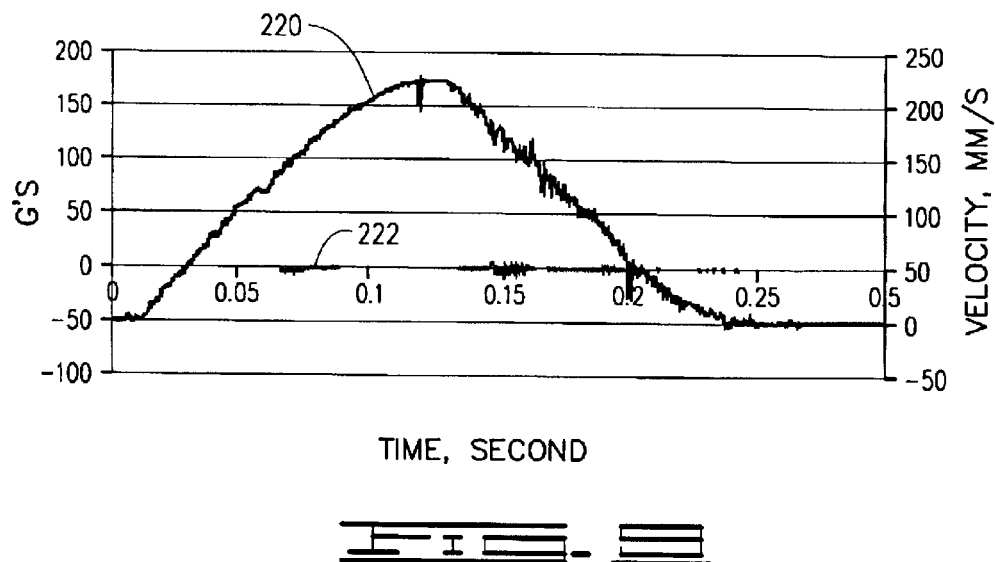
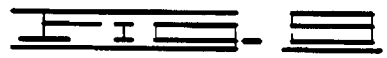

DAMPENING DATUM PLATE FOR DISC DRIVE COMPONENT ASSEMBLY

RELATED APPLICATION

This application claims priority to U.S. Provisional Application No. 60/415,816 filed Oct. 3, 2002 entitled Dampened Datum Plate for Low HDA Track.

FIELD OF THE INVENTION

The claimed invention relates generally to such components as disc drive data storage devices, and more particularly, but not by way of limitation, to an apparatus and method for dampening vibrational shock of components during assembly.

BACKGROUND

Disc drives are digital data storage devices that store and retrieve large amounts of user data in a fast and efficient manner. The data are magnetically recorded on the surfaces of one or more rigid data storage discs affixed to a spindle motor for rotation at a constant high speed. The discs and spindle motor are commonly referred to as a disc stack.

The disc stack is accessed by an array of vertically aligned data transducer heads that are controllably positioned by an actuator assembly. Each head typically includes electromagnetic transducer read and write elements that are carried on a fluid bearing slider. The fluid can be air or alternatively a fluid such as helium. The slider acts in a cooperative hydrodynamic relationship with a thin layer of fluid dragged along by the spinning discs to fly each head in a closely spaced relationship to the disc surface.

In order to maintain the proper flying relationship between the heads and the discs, the heads are attached to and supported by flexible suspension assemblies, also called flexures. An actuator motor, typically a voice coil motor (VCM), rotates the actuator assembly to cause the heads to move across the disc recording surfaces. The actuator assembly is also referred to as a head stack assembly (HSA). Both the disc stack and the head stack assembly are mounted to and supported by a rigid base deck of the drive.

Disc drives are typically manufactured using high volume automated assembly lines. In a typical automated line, disc drive components are conveyed to various assembly stations, each station adding a different set of components to, or performing a different operation on, the drives.

Marketing competition has driven the requirement that high volume assembly lines be operated at an ever increasing pace, and it has been necessary to increase the speed that components travel to the assembly stations. This includes increasing the travel velocity of the components during elevation and lowering of the components from conveyors at the assembly stations. Of course, this requires that machinery rapidly engage the components, and to impart rapid acceleration of the components, as the components are lifted at the assembly stations, followed by rapid deceleration of the components as they are lowered there from. The result is the incurrence of significant and often damaging shock vibrations to the components, and in some instances, this lifting and lowering of components is a limiting factor in the handling speeds of the assembly of such components.

There is therefore a continuing need for an accurate and fast method to move components, such as disc drive data storage devices, during assembly, while minimizing or eliminating the damage inherent in accelerating and decelerating the components, and to address other limitations associated with the current state of the art.

SUMMARY OF THE INVENTION

In accordance with preferred embodiments, the present invention provides a dampening datum plate assembly for an assembly line for components such as disc drive storage devices, the dampening datum plate assembly having a lift member for moving a component from a conveyor to a datum position at an assembly station. One or more dampening pin assemblies are supported at the datum position for absorbing vibrational shock from the component moved by the lift member.

The lift member has a lift plate on which are supported one or more second dampening pin assemblies for absorbing vibrational shock from contact of the lift plate with the component. The dampening pin assemblies have replaceable compressible pellet members that absorb vibrational shock and which are made of a material selected to provide a desired vibration attenuation.

These and various other features and advantages which characterize the claimed invention will become apparent upon reading the following detailed description and upon reviewing the associated drawings.

BRIEF DESCRIPTION OF THE DRAWINGS

FIG. 4 is a bottom plan view of the datum plate assembly of FIGS. 2 and 3.

FIG. 5 is a partially cutaway elevational view of one of the dampening pin assemblies of the datum plate assembly of FIG. 4.

FIGS. 8 and 9 are test comparisons of the shock vibrations incurred at an assembly station before and after the implementation of the present invention.

DETAILED DESCRIPTION

Figure 1:
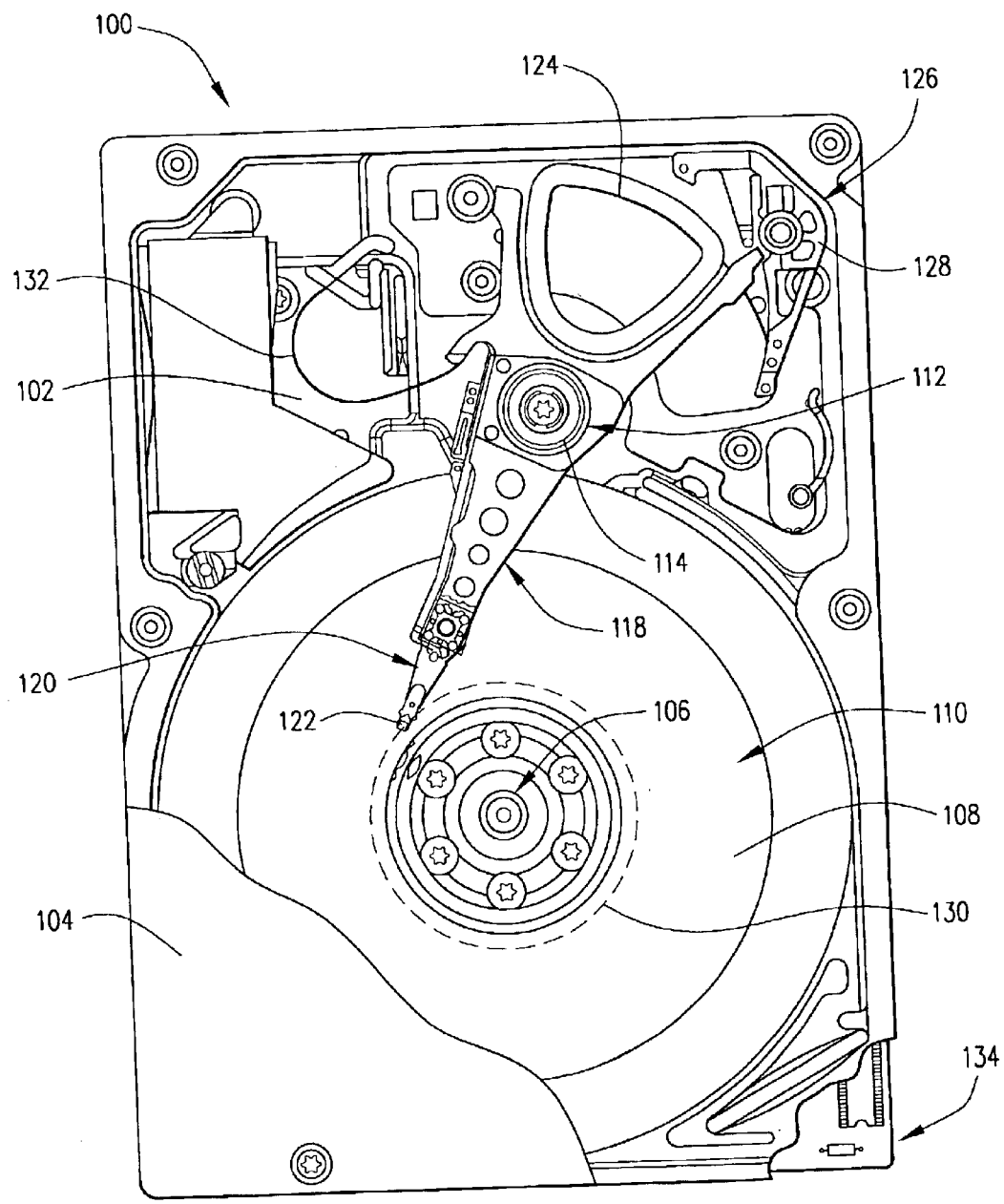
FIG. 1 is a top plan view of a disc drive constructed in accordance with preferred embodiments of the present invention.

Referring to the drawings in general and more particularly to FIG. 1, shown therein is a disc drive component 100 constructed in accordance with preferred embodiments of the present invention. A base deck 102 and a top cover 104 (partially cutaway in this view) cooperate to form a sealed housing for the disc drive component 100. A spindle motor 106 is supported by the base deck 102 and serves to support and rotate a number of magnetic recording discs 108 at a constant, high speed.

The discs 108 are stacked on a rotatable hub of the spindle motor 106 in a conventional fashion using suitable spacers and clamping elements (not separately designated). The spindle motor 106, discs 108, spacers and clamping elements collectively form a disc stack 110.

An actuator assembly 112, also called a head stack assembly or an HSA, includes a central body 114 configured to rotate about a cartridge bearing assembly 116 affixed to the base deck 102. A number of rigid actuator arms 118 extend from the central body 114 into the disc stack 110. Flexible suspension assemblies 120, also called flexures, extend from the arms 118 to support an array of data transducer heads 122.

While a single disc 108 and attendant data transducer heads 122 can be used, it is contemplated for purposes of the present description that the disc drive 100 includes a plurality of discs 108 and data transducer heads 122. The actuator arms 118 support the data transducer heads 122, with the top actuator arm 118 extending above the disc stack 110, as shown in FIG. 1, and the bottom actuator arm 118 extending below the disc stack 110. Each of the intermediary actuator arms 118, which extend between the discs 108, supports two flexures 120 and two data transducer heads 122.

The actuator assembly 112 is pivotally moved through the application of electrical current to a coil 124 of a voice coil motor (VCM) 126. When in a non-operational state, as shown in FIG. 1, the actuator assembly 112 is latched in a parked position by a toggle latch 128 and the data transducer heads 122 contact textured landing zones 130 (denoted by broken line) defined on the disc surfaces near the innermost diameters of the discs 108.

A flex circuit assembly 132 passes electrical signals between the data transducer heads 122 and a disc drive printed circuit board 134, also referred to as a PCB, and which supports communication and control electronics for the disc drive 100. The PCB 134 in FIG. 1 is mounted to the underside of the base deck 102.

While the present invention is not limited to use with the disc drive component 100 of FIG. 1, it is beneficial to presently describe the present invention in relation to the assembling of the disc drive 100. As noted above, modem day assembly of disc drives and other complex electronic apparatuses requires automated assembly lines having one or more assembly stations as may be necessary for any particular application.

One or more conveyors move individual parts and components to these assembly stations at rapid rates. Commonly, this requires high speed conveyors such as conveyor 140 shown in FIG. 2. The conveyor 140 has parallel rails 142, 144, with the rail 142 having power rollers 146 and the rail 144 having idler rollers 148. Preferably, the power rollers 146 are individually driven by motors (not shown) controlled by a programmable computer circuit (not shown). Preferably, the power rollers 146 will have a gripping, rubbery surface that will engage and move the base deck 102 along the conveyor's length, while the idler rollers 148 will have smooth, low friction surfaces.

While pallets can be especially configured for transporting components by the conveyor 140, in the present invention it is contemplated that the spatial separation of the power rollers 146 and the idler rollers 148 will be established to accept the span dimension of the base deck 102 so that the disc drives 100 are transported by the conveyor 140 without the use of pallets. In some cases, protrusions from the underside of the disc drive 100 may necessitate the inclusion of stand off rails extending from the underside of the base deck 102, the rails supporting the base deck 102 on the rollers 146, 148.

Figure 2:
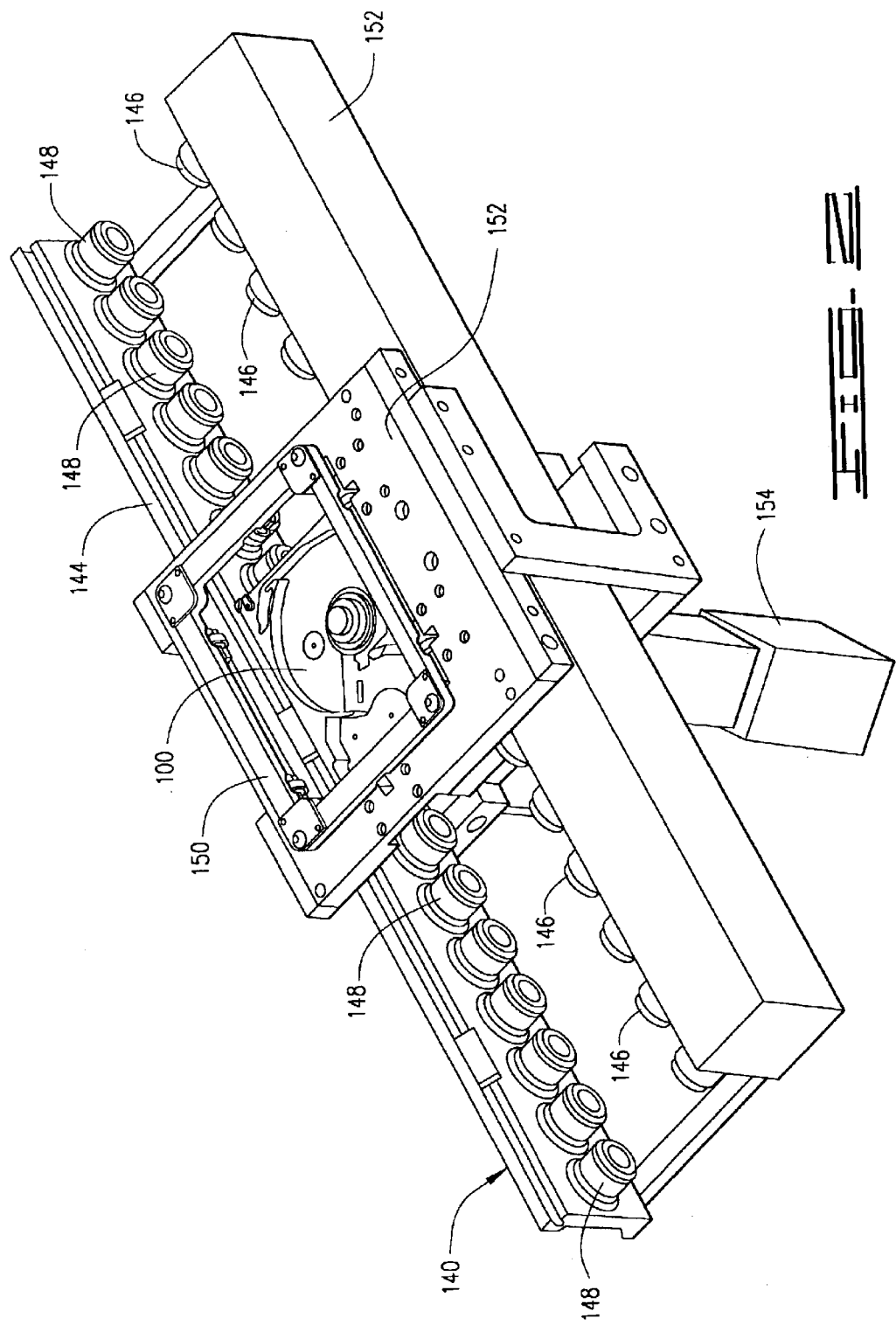
FIG. 2 is a perspective view of a conveyor and a crowder plate assembly supporting a datum plate assembly of the present invention, the conveyor supporting a disc drive component below the datum plate assembly.

The conveyor 140 is shown in FIG. 2 conveying a partially assembled disc drive 100, with the base deck 102 supported directly on the power rollers 146 and idler rollers 148, the conveyor 140 transporting the pallet disc drive component 100 to the assembly stations in sequence as determined by the operational steps of the assembly line (not shown).

In a typical disc drive assembly line, a datum plate or the like will be provided to define the precise position that a part or component is to be disposed for the operating step or steps to be performed by equipment at an assembly station. Shown in FIG. 2 is a datum plate 150 constructed in accordance with the present invention.

The datum plate 150 is supported in the opening of a crowder plate assembly 152 that is disposed to extend beneath the serviced assembly station (not shown) and over the conveyor 140. The crowder plate assembly 152 is of a prior design to the present invention, and as will be understood by persons skilled in the art, the crowder plate assembly 152 has strategically disposed, spring biased pusher wheels (not shown) on two sides of the crowder plate assembly 152 to push against selected datum, or reference, sides of the datum plate 150, thereby positioning the datum plate 150 in the opening of the crowder plate assembly 152 abutting the sides of the crowder plate assembly 152 opposing the pusher wheels.

Numerous structural details of the crowder plate assembly 152 are not included herein as such details of construction are well understood by persons skilled in the art. It is sufficient to note that the crowder plate assembly 152 serves to affix the datum plate 150 in spatial relationship to the assembly station served, and that the datum plate 150 itself defines the precise position of the conveyed electronic part or component, such as the partially assembled disc drive 100 depicted in FIG. 2.

Figure 3:
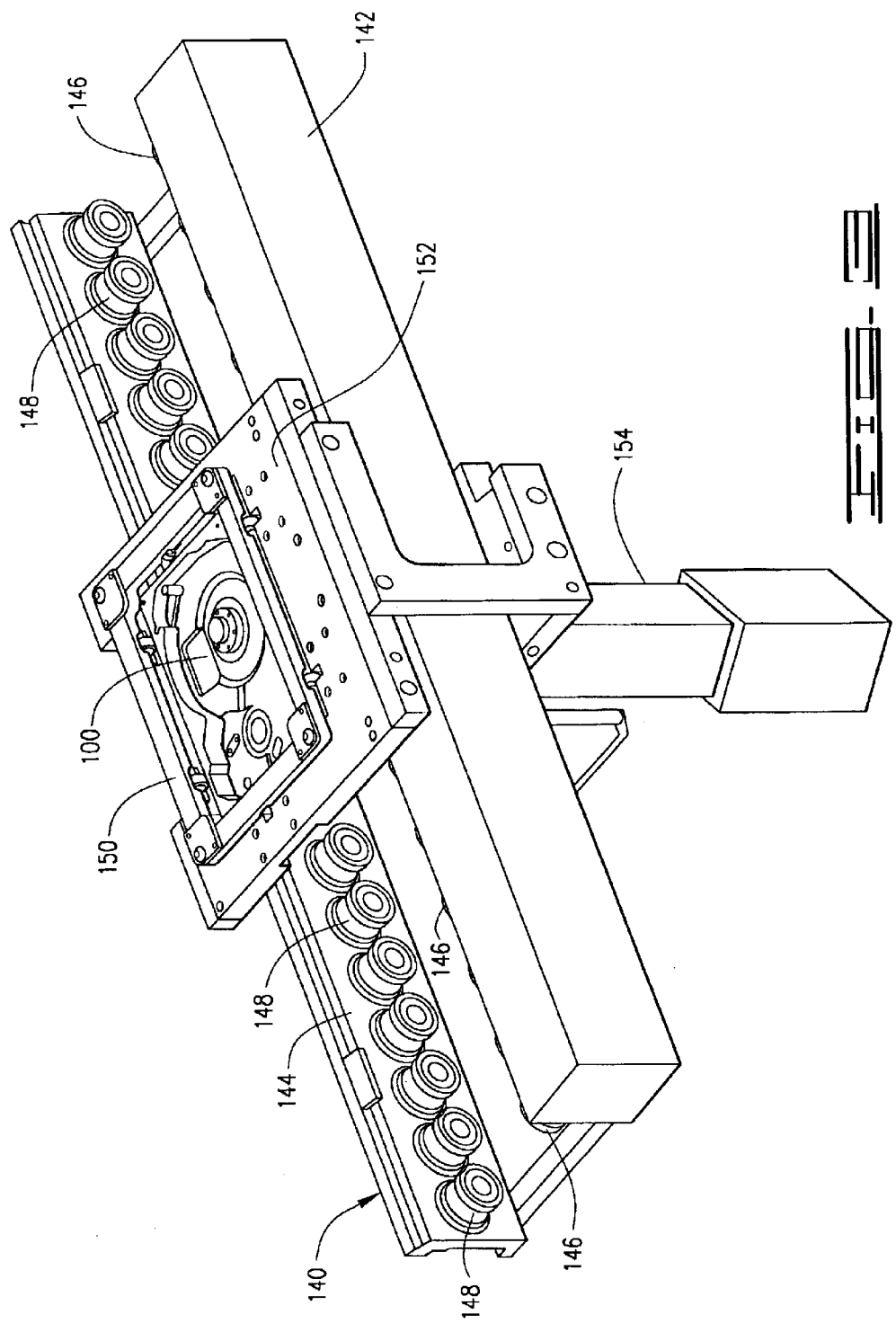
FIG. 3 is a perspective view similar to FIG. 2 with the disc drive lifted into abutting contact with the datum plate assembly.

A lifter actuator 154 is disposed beneath the conveyor 140 to raise the base deck 102 to the datum plate 150 as shown in FIG. 3. The lifter actuator 154 is preferably an extendible ball screw, because of the precision of extension thereof, but it will be appreciated that a fluid actuated cylinder could also be selected for this duty in some applications. Each of these types of lifter actuators is commercially available.

FIG. 4, as stated above, is a bottom plan view of the datum plate 150 and shows the opening therein which defines a work window 156 framed by the edge members of the datum plate 150. As will become clear below, the lifter actuator 154 has an extendible rod having a plate that is moved into contact with the base deck 102 to lift it into the work window 156 of the datum plate 150. As noted above, two adjoining sides of the datum plate 150 are selected as datum sides that the spring biased rollers of the crowder plate assembly 152 push against. It will be understood by those skilled in the art that the rollers of the crowder plate assembly 152 exert forces on the datum plate 150 in the x and y coordinates. For the z coordinate positioning, it is important that bottom surfaces 158 of the datum plate 150 be coplanar for the reason to be made clear below.

The datum plate 150 supports a dampening pin assembly 160 disposed near each of the corners thereof. FIG. 5 shows one of these dampening pin assemblies 160 in partial cutaway view to better illustrate the construction thereof. A bore 162 extends through the datum plate 150, and an oil impregnated bronze bushing 164 is pressed into the bore 162. A dampening pin 166 is disposed in the bore 162, and an impact pin portion 168 thereof extends through the bushing 164 to extend from the bottom surface 158 as shown. The dampening pin 166 has an upper hollow portion 170 that serves to form a compression chamber that contains a replaceable compressible pellet member 172. As will become clear below, the pellet 172 is selectively sized and made of a material with an appropriate durometer that will achieve a desired vibration attenuation; and preferably, the material is an elastomeric or polymeric composition, such as Sorbothane, a product and registered trademark of Sorbo, Inc.

A closure plate 174 is supported on the top surface of the datum plate 150 and attached thereto by screws (not shown) so that the dampening pin 166 and the compressible pellet 172 are confined within the bore 162. Preferably, the impact pin 168 is hollowed along at least a portion of its length to reduce the mass thereof.

The dimensions of the dampening pin 166 are established such that the dampening pin 166 is freely slidable in the bore 162, and such that when a datum surface 176 of the base deck 102 is brought into contact with the impact pin 168, an upper edge 178 of the hollow portion 170 of the dampening pin 166 will abut a bottom surface 180 of the closure plate 174, thereby causing the dampening pin assemblies 160 to serve as positive and precise compliant stops to the base deck 102. The hollow portion 170 has an internal diameter greater than the outer diameter of the pellet 172 to provide space for the free expansion of the pellet 172 in the hollow portion 170 as it is compressed by upward movement of the impact pin 168 as it is impacted by the upward movement of the base deck 102.

Figure 6:
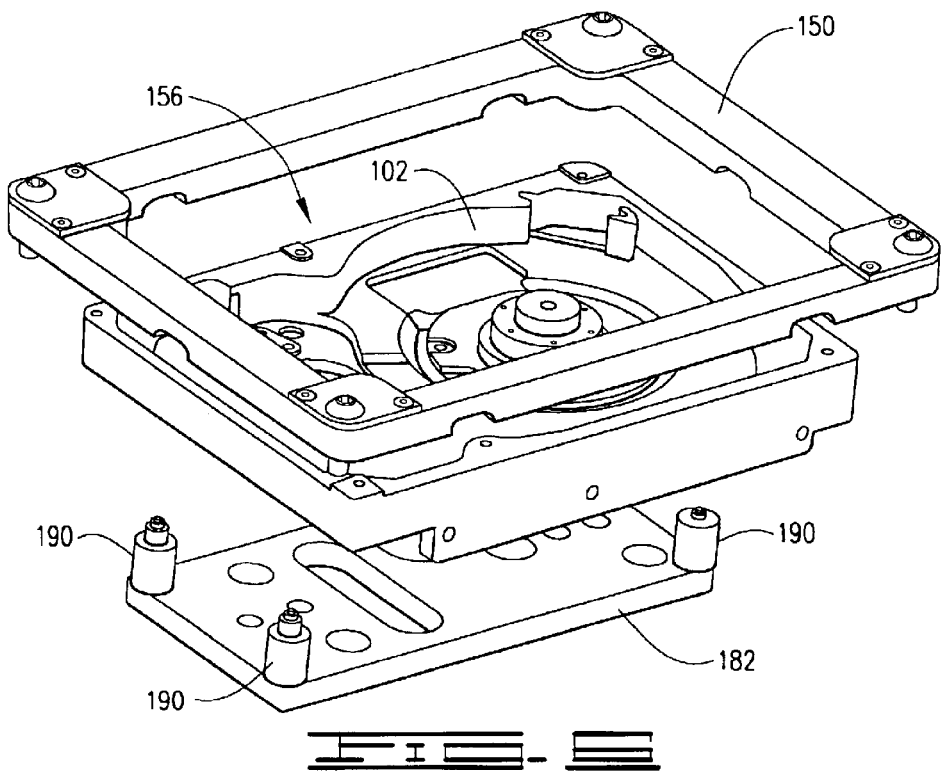
FIG. 6 is a perspective view, in isolation, of the datum plate assembly, the base deck of the disc drive and the lift plate of FIGS. 2 and 3.

FIG. 6 shows in isolation the datum plate 150 with the base deck 102, and below the latter is a lift plate 182 that is attached to, and driven by, the extendible rod of the lifter actuator 154. It is not thought necessary to describe the connection of the lift plate 182 to the lifter actuator 154 as such is well within the knowledge of ones skilled in the art. In operation, the conveyor 140 transports the base deck 102 to beneath the work window 156 of the datum plate 150, and the lifter actuator 154 moves the lift plate 182 into contact with the bottom of the base deck 102. Continuing upwardly, the lift plate 182 will cause the top surfaces 176 of the base deck 102 to come into contact with the dampening pin assemblies 160 supported by the datum plate 150, which in turn is supported within the crowder plate assembly 152 (not shown in FIG. 6).

As noted above, competitive marketing pressures have seen the need to continually find ways to increase the speed of operation of disc drive assembly lines, and this has meant that the travel times of the components has had to increase. It will be appreciated that, with a cycle time of about a fourth of a second in each direction, the impact of the lift plate 182 with the base deck 102 and of the base deck 102 with the dampening pin assemblies 160 of the datum plate 150 can cause considerable shock vibrations.

Figure 7:
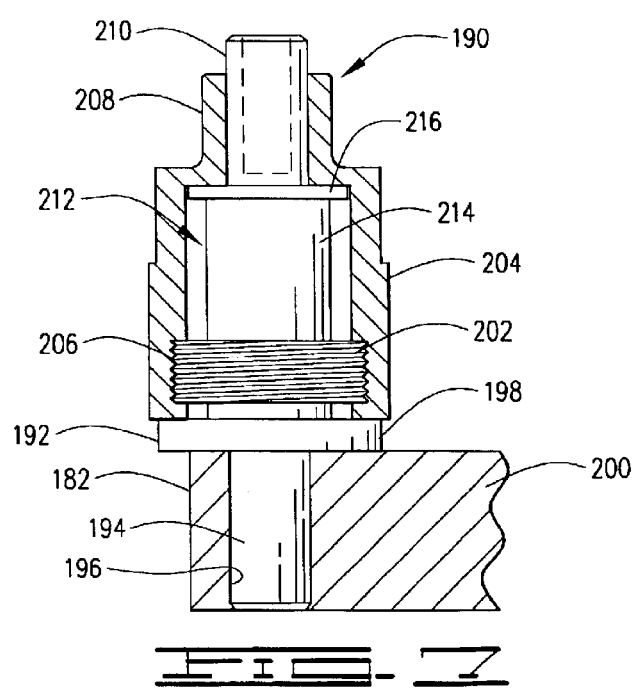
FIG. 7 is a partially cutaway, elevational view of one of the dampening pin assemblies supported by the lift plate of FIGS. 2 and 3.

The provision of the dampening pin assemblies 160 reduces such impact shock considerably, and in similar fashion, the lifter plate 182 in the present invention is provided similar dampeners in the form of dampening pin assemblies 190 supported near the corners of the lift plate 182. FIG. 7 shows a partial cutaway view of one of the dampening pin assemblies supported on the lifter plate 182. The dampening pin assembly 190 has an attaching pin portion 192 that has an insertion pin 194 that is pressed into an appropriately sized bore 196 in the lifter plate 182. The attaching pin portion 192 has a shoulder 198 that is pressed into firm abutment with planar upper surface 200 of the lifter plate 182. The attaching pin portion 192 has a threaded connector 202 extending from the shoulder 198.

The dampening pin assembly 190 has a hollow body portion 204 that is threaded at its lower end 206 to be screwed onto the connector 202 of the attaching pin portion 192. The inner diameter of the hollow body 204 is reduced at a bored upper end 208, and an impact pin 210 extends therethrough. The impact pin 210 is preferably hollowed to reduce its mass and thus the lower the shock level attributable to the body portion.

The body 204 forms a compression chamber 212 having communication with the bored upper end 208, and contained within the compression chamber 212 is a replaceable compressible pellet member 214. The pellet 214 is preferably of the same size, material and durometer rating as that of the pellet member 172, although this is not limiting of the present invention, and if so, the pellet members 172 and 214 can be interchangeable. The impact pin 210 has a shoulder 216 disposed to contact the pellet 214 and dimensioned to slidably fit in the compression chamber 212. The compression chamber 212 has an inner diameter sufficiently larger than that of the pellet 214 so that space is provided for the expansion of the pellet 214 when compressed by the inner movement of the impact pin 210 as the lifter plate 182 is caused to move upward by the actuator 154 and the impact pins 210 come into contact with the body plate 102 of the disc drive 100.

FIGS. 8 and 9 illustrate the effectiveness of the present invention as these figures present data from before and after inclusion of the dampening pin assemblies 160 and dampening pin assemblies 190 on the datum plate 150 and the lifter plate 182, respectively. In testing the present invention, a datum plate and a lift plate, identical in structure (except without the inclusion of the improvements of the present invention) to the datum plate 150 and the lift plate 182, respectively, that were used in assembly production of disc drive assembly before adaptation of the present invention were selected to obtain the data represented by FIG. 8. Identical tests then were performed utilizing the datum plate 150 and the lift plate 182 to obtain the data represented by FIG. 9.

In all of the tests, an accelerometer was mounted onto the base deck 102, and a velocity transducer was mounted onto the lift plate 182. The actuator assembly 154 was cycled to lift and lower the lift plate 182 and thereby the base deck 102, thereby causing the base deck 102 to come into contact with the datum plate 150 and to subsequently be lowered there from. In each of FIGS. 8 and 9, the curve 220 depicts the velocity the lifting of the base deck 102 in millimeters per second versa time in seconds. The curve 222 depicts the shock of the base deck 102 in G-force versa time in seconds. These curves reflect only the lifting portion of the cycle and do not reflect the lowering of the base deck 102.

Referring to FIG. 8, the bundle of vibrations 224 represents the shock of the accelerometer when the base deck 102 is initially impacted by the lift plate 182, and the second bundle of vibrations 226 represents the shock when the base deck impacts the datum plate 150. (It will be appreciated that, for convenience of description, the base datum plate and the lift plate in this test are referenced as datum plate 150 and lift plate 182, even though these components were not equipped with the dampening pin assemblies 160 and 190, respectively.)

Turning to FIG. 9, it will be noted that the velocity curve 220 therein is substantially the same as that of FIG. 8. Yet, there is a substantial difference in the vibration curve 22 between FIGS. 8 and 9. The vibration bundles 224 and 226 in the latter figure are essentially eliminated or at least materially reduced. The dramatic dampening of the shock vibrations of the base deck 102, and thus of the disc drive 100 and its components, by the present invention is clearly illustrated by FIGS. 8 and 9.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the merge comb inspection apparatus and method without departing from the spirit and scope of the present invention.

In addition, although the embodiments described herein are generally directed to a merge comb inspection apparatus and method for the manufacture of a disc drive data storage device, it will be appreciated by those skilled in the art that the merge comb inspection apparatus and method can be used for other types of data storage systems without departing from the spirit and scope of the claimed invention.

What is claimed is:

1. A dampening datum plate assembly for use in an assembly line having at least one assembly station with a datum position, a conveyor transporting a component to the assembly station and a lift plate member moving the component from the conveyor to the datum position, the dampening datum plate assembly comprising:

at least one dampening pin assembly supported at the datum position for absorbing vibrational shock from contact with the component.

2. The assembly of claim 1 further comprising:

a datum plate;

a crowder plate assembly for supporting the datum plate at the datum position; and wherein the dampening pin assembly is supported by the datum plate.

3. The assembly of claim 2 wherein the datum plate has a bore, and wherein the dampening pin assembly comprises:

a dampening pin slidably disposed in the bore and forming a compression chamber, the dampening pin having an impact pin extending from the bore;

a closure plate attached to the datum plate and closing the bore at one end thereof; and a compressible pellet member supported by the dampening pin in the compression chamber against the closure plate so that the pellet member is compressed when the impact pin is contacted by the component.

4. The assembly of claim 3 wherein the dampening pin assembly further comprises:

a bushing pressed into the bore of the datum plate, the impact pin extending from the bushing.

5. The assembly of claim 4 wherein the bushing is made of an oil impregnated bronze.

6. The assembly of claim 5 wherein the impact pin is hollow along a portion of its length.

7. The assembly of claim 6 wherein the compressible pellet member is replaceable.

8. The assembly of claim 7 wherein a desired vibration response can be achieved by selecting the size, material of construction and durometer of the compressible pellet member.

9. The assembly of claim 8 wherein the compressible pellet member is made of Sorbothane.

10. The assembly of claim 9 wherein the dampened data plate comprises:

a lift plate supported by the lift member having at least one second dampening pin assembly for absorbing vibrational shock from contact of the lift plate with the disc drive component.

11. The assembly of claim 10 wherein the lift plate has a bore, and wherein the second dampening pin assembly comprises:

an attaching pin having a portion disposable in the bore of the lift plate, the attaching pin having a shoulder abutting the surface of the lift plate and a threaded connector;

a body member having a threaded first end for receiving the connector therein and a bored second end, the body member forming a compression chamber communicating with the bored second end;

an impact pin having a shoulder at one end thereof disposed in the compression chamber and having a second end extending from the bored second end of the body member; and a compressible pellet member disposed in the compression chamber and disposed between the shoulder of the impact pin and the connector so that the pellet member is compressed within the compression chamber when the second impact pin therein contacts the component.

12. The assembly of claim 11 wherein the second impact pin is hollow along a portion of its length.

13. A dampening datum plate assembly for use in an assembly line having at least one assembly station with a datum position, and a conveyor transporting a component to the assembly station, the assembly comprising:

at least one first dampening pin assembly supported at the datum position; and moving means for moving the disc drive component from the conveyor to the datum position of the assembly station, the first dampening pin assembly absorbing vibrational shock from the contact of the component, and the moving means comprising:

a plate; and at least one second dampening pin assembly supported by the plate for absorbing vibrational shock from contact of the plate with the component.

14. The assembly of claim 13 further comprising:

a datum plate;

a crowder plate assembly for supporting the datum plate at the datum position; and wherein the first dampening pin assembly is supported by the datum plate.

15. The assembly of claim 14 wherein the datum plate has a bore, and wherein the dampening pin assembly comprises:

a first dampening pin slidably disposed in the bore and forming a compression chamber, the first dampening pin having a first impact pin extending from the bore;

a closure plate attached to the datum plate and closing the bore at one end thereof; and a compressible pellet member supported by the first dampening pin in the compression chamber against the closure plate so that the pellet member is compressed when the first impact pin is contacted by the disc drive component.

16. The assembly of claim 15 wherein the first dampening pin assembly further comprises:

a bushing pressed into the bore of the datum plate, the impact pin extending from the bushing.

17. The assembly of claim 16 wherein the bushing is made of an oil impregnated bronze.

18. The assembly of claim 17 wherein the first impact pin is hollow along a portion of its length.

19. The assembly of claim 18 wherein the compressible pellet member is replaceable.

20. The assembly of claim 19 wherein a desired vibration response can be achieved by selecting the material of construction and durometer of the compressible pellet member.

21. The assembly of claim 20 wherein the compressible pellet member is made of Sorbothane.

22. The assembly of claim 21 wherein the plate has a bore, and wherein the second dampening pin assembly comprises:

an attaching pin having a portion disposable in the bore of the plate, the attaching pin having a shoulder abutting the surface of the plate and a threaded connector;

a body member having a threaded first end for receiving the connector therein and a bored second end, the body member forming a compression chamber communicating with the bored second end;

a second impact pin having a shoulder at one end thereof disposed in the compression chamber and having a second end extending from the bored second end of the body member; and a compressible pellet member disposed in the compression chamber between the shoulder of the second impact pin and the connector so that the pellet member is compressed within the compression chamber when the second impact pin contacts the component.

23. The assembly of claim 22 wherein the second impact pin is hollow along a portion of its length.

24. The assembly of claim 23 wherein the compressible pellet member is replaceable.

25. The assembly of claim 24 wherein a desired vibration response can be achieved by selecting the material of construction and durometer of the compressible pellet member.

26. The assembly of claim 25 wherein the compressible pellet member is made of Sorbothane.

27. In an assembly line for assembling components, the assembly line having an assembly station at which a component is received from a conveyor, a dampening datum plate assembly comprising:

moving means for moving the component from the conveyor to the assembly station;

means for absorbing shock from the component.

* * * * *